W. P. FAULKNER.
LOCKING DEVICE FOR AUTOMOBILES.
APPLICATION FILED APR. 9, 1921.
1,412,854. Patented Apr. 18, 1922.
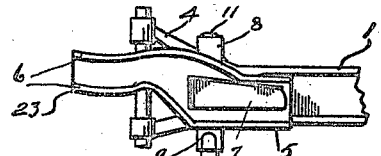
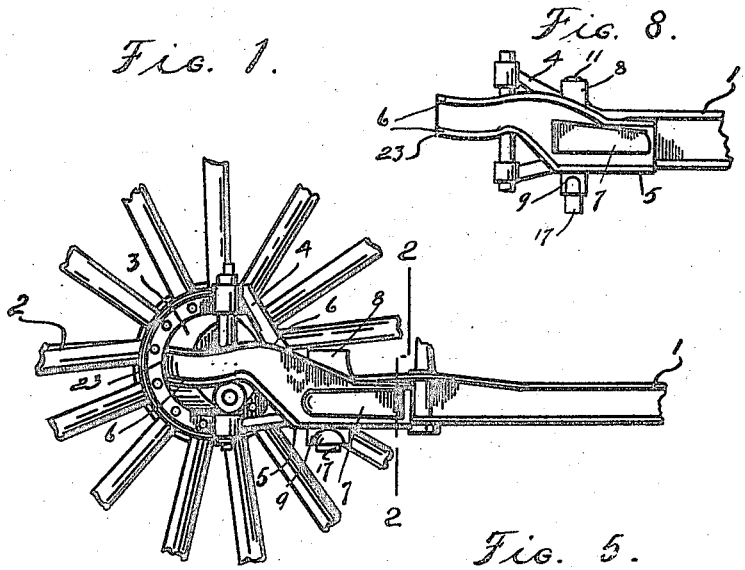
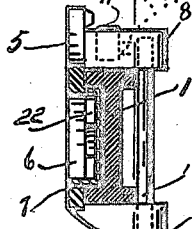
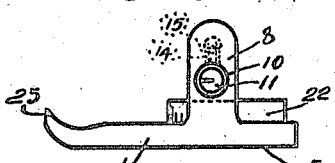
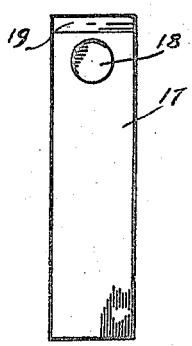
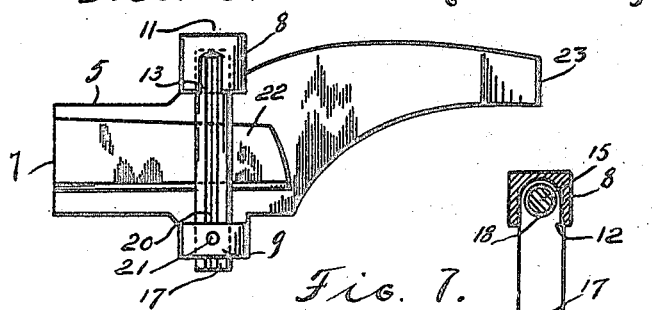
INVENTOR
William P. Faulkner.
BY
M. C. Gillham
ATTORNEY

UNITED STATES PATENT OFFICE.

WILLIAM P. FAULKNER, OF ROSEDALE, KANSAS.

LOCKING DEVICE FOR AUTOMOBILES.

1,412,854. Specification of Letters Patent. Patented Apr. 18, 1922.

Application filed April 9, 1921. Serial No. 460,131.

*To all whom it may concern:*

Be it known that I, WILLIAM P. FAULKNER, a citizen of the United States, residing in the city of Rosedale, in the county of Wyandotte and State of Kansas, have invented a new and useful Locking Device for Automobiles, of which the following is a specification.

My invention relates to improvements in locking devices for automobiles, and particularly to a device of this character for which I did apply for Letters Patent on September 27, 1920, Serial No. 413,044, and the object of the invention is to improve and simplify the structure by the provision of means for adjustably mounting the device on the axle of the automobile to prevent inward movement of the device on axles of cars which have either straight, constricted or expanded end portions, and also to provide an improved locking device for locking the device on the axle, whereby the device shall positively hold the bearing wheel deflected and prevent running the car in a straight course.

I attain these objects and other advantages by the structure illustrated in the accompanying drawing in which—

Figure 1, is a perspective view of the device applied on the front axle of an automobile, and showing the wheel held deflected thereby; Figure 2, is a cross section of the device on the line 2—2, in Figure 1; Figure 3, is a rear elevation of the device, and showing the tapering block thereon, and the means for locking the device on the axle; Figure 4, is a top view of the device, and showing the upper edge of the tapering block; Figure 5, is an end view of the lock bolt; Figure 6, is a rear elevation of the same; Figure 7, is a sectional view taken on the line 7—7, in Figure 2, and Figure 8, is a front view of the device applied on the expanded end portion of the axle, and showing the tapering block reversed, a modified form thereof.

Similar numerals of reference refer to corresponding parts throughout the several views.

The numeral 1, designates the front axle of an automobile, 2, the bearing wheel having a hub 3, which pivots on the bearing yoke 4, on the end of the axle, the latter being of the customary I-beam type. The locking device 5, is made of any suitable material, preferably of malleable iron which, because of its well known toughness, is especially adapted for the purpose. The device comprises an elongated plate provided with a suitable contour and having on the edges of its front side flanges 6. The attaching portion 7, of the device has vertically aligned lateral lugs 8 and 9, which are integral with the upper and lower margins of the back of the plate, and they are spaced apart sufficiently to snugly receive the axle between them. A vertical bore 10, is made in the top of the upper lug 8, in which bore a barrel lock 11, is secured in any suitable manner. A vertical bore 12, is made in the lower side of the lug 8, adjacent the terminal end thereof, and a recessed opening 13 is made in the end of the lug to provide communication or access to the bore 12. A bore 14, is made in the interior of the lug which bore communicates with the bores 10 and 12, and is adapted for receiving a yielding lock bolt 15, which is associated with the lock 11. The bore 12, is semicircular in form, the flat wall thereof being parallel with the axle in vertical direction. A similar semicircular hole 16, is apertured vertically in the lug 9, and is made to register with the bore 12. In the hole 16, and extending into the bore 12, is a bolt 17, having in its upper portion, in the flat side thereof, a hole 18, into which the lock bolt 15 shoots. The upper edge of the flat side of the bolt 17, is beveled, as shown at 19.

A channel 20, is formed in the convexed side of the bolt 17, and extends longitudinally of the bolt to adjacent the upper end thereof. A pin 21 pierces the end of the lug 9 and is projected into the channel 20, and functioning there as a stop to limit the drop movement of the bolt. On the rearward side of the attaching portion of the device is an oblong boss or block 22, which is arranged thereon to lodge in the channel of the axle when the latter is received between the lugs 8 and 9, and cooperate with the lugs to bind upon the flanges of the axles to hold the device in place on the axle. In Figure 3, the boss or block 22, is tapered inwardly of the end of the plate, which formation is particularly adapted for mounting on axles having constricted end portions, as is also shown in the view mentioned. It is obvious that the boss or block 22, may be reversed in direction on the device and thereby adapting the device for mounting on axles having spreading axles. The locking device, outwardly of the lugs 8 and 9, is curved upward and then extended substantially straight a suitable distance and the end portion thereof slightly curved inward, thus forming a stop 23, to engage the inner side of the wheel and hold the latter deflected. The device is portable and is mounted on the axle when the driver leaves the car on the street temporarily, or when the car is stored in garage, operating to hold the wheel deflected and preventing the moving of the car in a straight course. To apply the device, the wheel of the car is turned outward in suitable degree and the device placed on the axle adjacent the end thereof, in such a manner that the flanges at the front of the axle shall enter between the inner sides of the lugs 8 and 9, and the upper and lower edges of the boss or block 22. The bolt 17, is then moved upward until the beveled edge of the bolt shall engage and press back the lock bolt and, continuing, until the hole 18, is presented to the end of the lock bolt, whereupon, the lock bolt shoots into the hole 18, thus the device is locked in position on the axle, and the stop 23, is bearing on the inner side of the wheel. If pressure is applied on the wheel and against the end of the stop 23, the device will not be moved inward, since the taper of the boss 22, cooperating with the lugs 8 and 9, acting upon the tapering flanges of the axle, will only add to the security of the device. In the case of the spreading end of axles the same result would be obtained, as shown in Figure 8. To release the locking device the lock key, not shown, is inserted in the lock and the bolt 15 withdrawn from the bolt 17, in the well known manner, whereupon, the bolt 17, will drop by gravity through the lug 9, until the end of the channel 20, engages the pin 21, when the device may be lifted from the axle. The bolt 17 operates to clamp the device on the axle.

Having described my invention what I claim is—

In a locking device for automobiles, the combination with the axle and the bearing wheels thereon, of a portable stop member mounted on the axle and arranged thereon to engage the wheel and hold the same deflected, said stop member consisting of an elongated plate having on its rearward side an elongated longitudinally extending boss or block having tapered edges and adapted for snugly entering between the front flanges of the axle and vertically aligned laterally extending lugs which are spaced apart suitably for receiving between them the axle, the space between the edges of the boss or block and the inner sides of the lugs forming channels for receiving the front flanges of the axle, the outer end portion of the member being arranged to extend from the axle to and against the wheel when the latter is deflected, a bolt vertically piercing the lower lug and penetrating the upper lug and adapted for dropping by gravity, and yielding means associated with the upper lug and adapted for engaging and disengaging said bolt.

Kansas City, Missouri, April 5th, 1921.

WILLIAM P. FAULKNER.

Witnesses:
JOHN C. STEARNS,
L. G. THOMAS.